No. 650,065. Patented May 22, 1900.
A. KITSON.
GAGE FOR USE IN CONNECTION WITH FLUID DISTRIBUTION.
(Application filed Apr. 8, 1899.)
(No Model.)
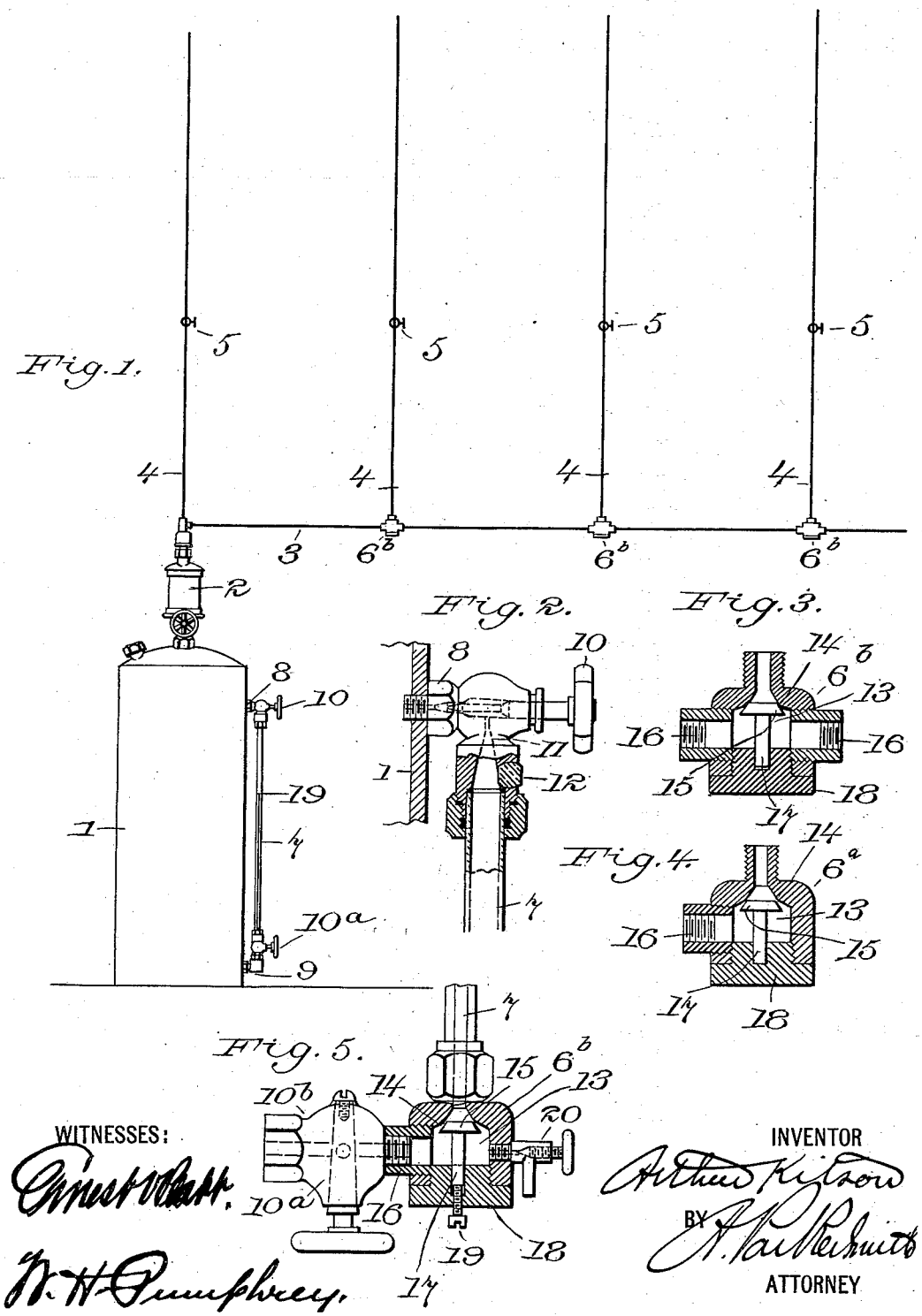

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

GAGE FOR USE IN CONNECTION WITH FLUID DISTRIBUTION.

SPECIFICATION forming part of Letters Patent No. 650,065, dated May 22, 1900.

Application filed April 3, 1899. Serial No. 711,560. (No model.)

*To all whom it may concern:*

Be it known that I, ARTHUR KITSON, a subject of the Queen of Great Britain, and a resident of Philadelphia, county of Philadelphia, State of Pennsylvania, have invented certain new and useful Improvements in Gages for Use in Connection with Fluid Distribution, of which the following is a specification.

My invention relates to systems for the distribution of fluids under pressure, and is more specifically designed to produce an automatically-closing system which will operate to prevent leakage of fluid when any of the connections are broken. In the use of vapor-burning lamps, for instance, oil is supplied under pressure from the tank through a system of tubing to a number of said lamps, and it becomes desirable to have some simple and efficient means for automatically closing the tubes and checking the flow of oil in case one of the branches or any of the connections become broken. It is also desirable to relieve the system from pressure without at the same time allowing the oil to flow out in case the building gets on fire. My improved check-valve system accomplishes both these results.

The preferred construction of valve and arrangement of the same are illustrated in the accompanying sheet of drawings, in which—

Figure 1 is a diagrammatic view of an oil-tank and a system of tubing connected therewith. Fig. 2 is an enlarged detail of the upper gage-glass connection with the tank. Fig. 3 is an enlarged sectional detail of check-valve located at each branch of tubing. Fig. 4 is a similar section of the check-valve located at the lower gage-glass connection. Fig. 5 shows a modification.

Throughout the drawings like reference-figures refer to like parts.

The tank 1, preferably formed of steel, contains a certain amount of oil and a certain amount of air under pressure. The air forces the oil up through the filter 2 by means of a pipe extending from said filter down into the interior of the reservoir and nearly to the bottom thereof in the usual manner (not shown, however, in the drawings) and main line of tubing 3 to the various branch lines of tubing 4 4, &c. Each of these branch lines is controlled by a hand-valve 5 5, &c., and also has one of a series of check-valves $6^b$ $6^b$ located at the point where the branch leaves the main. The tank is also provided with the ordinary gage-glass 7, through which the level of the oil in the tank can be determined. This gage-glass of course has an upper connection 8 and a lower connection 9 with the tank, the upper connection opening into the air-space and the lower connection into the oil-space. These connections are also provided with the ordinary hand-valves 10 $10^a$. The upper connection 8 preferably has only a contracted passage-way 11, through which the air can pass to the gage-glass 7, and this connection may also have an opening filled with a plug of fusible material 12. At the lower connection 9 I insert a check-valve $6^a$ of the shape shown in Fig. 4, which has a valve-chamber 13, with an overhead seat 14. The loose valve-plunger 15 is adapted to rise against said seat and close the outlet-passage from the valve-chamber.

One or more inlet-orifices 16 are formed in the valve-chamber below the valve-seat. The valve-plunger 15 has a small spindle 17 projecting downwardly and working in a guide formed in the removable cap 18, which forms the bottom of the valve-chamber. The valve $6^b$ (shown in Fig. 3) has two inlet-openings 16 16 on either side of the valve-chamber and below the valve-plunger, so that there is always a free passage-way through it and through the sections of the supply-pipe connected thereto to other branch pipes, whether or not communication is closed to the particular branch pipe which said valve controls.

In the modified form shown in Fig. 5 a screw 19 is tapped into the head or cap 18 in such position that the spindle 17 abuts against it. The valve-opening can then be adjusted by means of the screw 19 without removing cap 18.

To facilitate the opening of the check-valve after it has automatically closed, the vent-cock 20 is tapped into the casing and connects with the valve-chamber below the valve. The gage-cock $10^a$ should then be changed to the position $10^b$ between the tank and the check-valve.

The method of operation of my invention is as follows: The tank 1 being filled with oil—say to the level of 19—and the upper portion filled with air at the usual pressure of about fifty pounds, oil flows through the filter 2, main line 3, and branches 4 4 to the lamps or other consuming devices. The plunger 15 of the check-valve is in its normal or lowered position, (shown in Fig. 4,) and the fluid passes freely at slow speed through the check-valve to the various branches and to or from the gage-glass 7. In case one of the lamps breaks or one of the branch tubes 4 is cut there will be a greatly-increased flow through the corresponding check-valve $6^b$. This greater velocity means considerable difference of pressures on the two sides of the plunger 15, that on the lower side predominating. The plunger promptly rises, therefore, and closes the outlet passage-way, as shown in Fig. 3. So promptly is this done in practice that only a few drops of oil will escape if the tube is sawed in two. The hand-valve 5 in the broken branch is then closed and the break repaired. As only an infinitesimal quantity of oil is needed to fill the branch tube 4 between the check-valve 6 and the hand-valve 5, the same may slowly ooze through the check-valve by the time the repairs are completed, and the equality of pressure being established on the two sides of the plunger 15 it will drop down into position shown in Fig. 4, and communication will be reëstablished. If it does not drop down of itself, a sharp blow on the valve with a hammer will jar it down. On reopening the hand-valve 5 gradually the oil will pass through and fill the remainder of the branch tube and communication with the particular lamp fed thereby will be reëstablished.

When a vent-cock such as is shown in Fig. 5 is used, the pressure can be immediately relieved, so that the check-valve will drop open by opening said vent-cock 20. The mode of operation is the same when the form shown in Fig. 5 is used at the lower end of the gage-glass. The gage-cock $10^b$ is closed and vent-cock 20 opened.

In case of the building catching fire and subjecting the oil in the tank to great heat the same might burst and scatter the oil through the burning building, thereby greatly aggravating the conflagration. With the use of my invention, however, the presence of the first tongue of flame will crack the gage-glass 7 or melt the fusible plug 12, the check-valve 9 will instantly close and stop the flow of oil. At the same time the air trapped in the upper part of the tank will slowly escape through the contracted passage-way 11 in the upper connection 8 and the oil remaining in the tank will simply be left under atmospheric pressure in an almost fireproof receptacle, so that the danger will be less than would be the case if the same quantity of oil were stored in an ordinary tin can for ordinary uses. The same operation of course prevents the loss of oil in case the gage-glass is broken by being accidentally struck at any time.

The amount of increase in the velocity of the fluid passing through the check-valve necessary to close the same can be determined and adjusted in fount shown in Figs. 3 and 4 by removing the cap 18 or other removable guide for the spindle 17 of the valve and filing off more or less of the end of said spindle, thereby determining the normal opening of the valve. It is evident of course that the greater this normal opening the greater the amount of fluid which the valve will pass without closing.

It is evident, of course, that various changes could be made in the details of construction illustrated without departing from the spirit and scope of my invention so long as the relative arrangement of parts shown in the drawings or the principle of operation set forth in the specification is preserved. Other forms of valve-plunger and valve-chamber might be used, a different removable guide might be substituted for the cap 18, the fusible plug 12 might be made of different size and shape, &c.; but these are changes of form and not of substance, and I regard the modifications so produced as still within the scope of my invention.

Having therefore described my invention, what I claim as new, and desire to protect by Letters Patent, is—

1. In a system for distributing fluid under pressure, the combination of the pressure-tank, the gage-glass mounted on the side of the same, and connected thereto at each end, and the outwardly-closing check-valve in the lower connection, the upper connection being provided with only an extremely-contracted air passage-way communicating with the upper pressure-tank, together with a valve located between said contracted air passage-way and the connection to the pressure-tank.

2. In a system for distributing fluids under pressure, the combination of the pressure-tank, the gage-glass mounted on the side of the same and connected thereto at each end, and the outwardly-closing check-valve in the lower connection, together with the upper connection having an opening closed with fusible material.

3. In a system for distributing fluids under pressure, the combination of the pressure-tank, the gage-glass mounted on the side of the same and connected thereto at each end, and the outwardly-closing check-valve in the lower connection, together with the upper connection having an opening closed with fusible material, and having only an extremely-contracted air passage-way communicating with the pressure-tank.

Signed by me at Philadelphia, Pennsylvania, this 28th day of March, 1899.

ARTHUR KITSON.

Witnesses:
 THOS. K. OBER, Jr.,
 LOUIS R. BAKER.

It is hereby certified that in Letters Patent No. 650,065, granted May 22, 1900, upon the application of Arthur Kitson, of Philadelphia, Pennsylvania, for an improvement in "Gages for Use in Connection with Fluid Distribution," an error appears in the printed specification requiring correction, as follows: In line 73, page 2, the word "fount" should read *forms*; and that the said Letters Patent should be read with this correction therein that the same may conform to the record of the case in the Patent Office.

Signed, countersigned, and sealed this 29th day of May, A. D., 1900.

[SEAL.]

F. L. CAMPBELL,
*Assistant Secretary of the Interior.*

Countersigned:
    C. H. DUELL,
        *Commissioner of Patents.*